United States Patent Office 3,576,810
Patented Apr. 27, 1971

3,576,810
1-SUBSTITUTED-3-(-4)-AROYLPIPERIDINES
Robert L. Duncan, Jr., and Grover Cleveland Helsley, Richmond, Va., assignors to A. H. Robins Company, Incorporated, Richmond, Va.
No Drawing. Filed June 20, 1968, Ser. No. 738,420
Int. Cl. C07d 29/20
U.S. Cl. 260—294
17 Claims

ABSTRACT OF THE DISCLOSURE

1 - substituted-3-aroylpiperidines and 1-substituted-4-aroylpiperidines are described which have been shown to be useful as tranquilizing agents. The compounds are prepared from nipecotic acid and isonipecotic acid using the Friedel-Crafts ketone synthesis.

The present invention relates to certain novel heterocyclic compounds which may be referred to as 3- and 4-aroylpiperidines and is more particularly concerned with 1-substituted-3-aroylpiperidines and 1-substituted-4-aroylpiperidines, compositions containing the same as active ingredients, and the methods of making and using them.

The invention is particularly concerned with 1-substituted-3-aroylpiperidines and 1-substituted-4-aroylpiperidines represented by the following general structural formula:

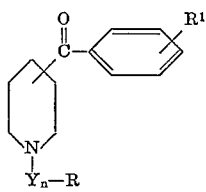

Formula I wherein:

R is acetyl, aryl, aryllower-alkyl, aryloxy, aroyl, carbamoyl, N-lower-alkyl carbamoyloxy, carbamoyloxy, hydroxy, ethoxy, 4-phenyl-1-piperazinylacetyl, N-lower-alkyl carbamoyl, N,N-di-lower-alkyl carbamoyl, N-aryl thiocarbamoyl, N-arylcarbamoyl, carbethoxy, and 2,3-dihydroxypropyl,
$R^1$ is hydrogen, lower alkoxy, trifluoromethyl, halogen having an atomic weight less than 80, and lower alkyl,
Y is methylene,
$n$ is a positive integer from 0–4 inclusive, and acid-addition salts thereof.

The compounds of the invention having the foregoing Formula I are generally characterized by important pharmacological activity and are effective as tranquilizing agents and, as such, are particularly useful in inducing an anti-anxiety effect in a living animal body.

The tranquilizing activity of the novel compound of the present invention was demonstrated in animals using a recognized procedure for determining the aforementioned property. It has been recognized that compounds which, when administered to mice that have been rendered aggressive by environmental conditions, block the fighting and aggressive behavior of such mice are useful as major tranquilizers in living animal bodies. The method used in determining the tranquilizing or anti-anxiety activity of the compounds described hereinafter was that of Da Vanzo, J. P. et al., Psychopharmocologia 9, 210 (1966).

Merely by way of illustration, the compounds of Examples 4 and 5, namely 1-[3-(p-acetyl-o-methoxyphenoxy)-propyl]-4-(p-fluorobenzoyl)-piperidine and 4-(p-fluorobenzoyl)-1-[3-(p-fluorobenzoyl)propyl] - piperidine represents the preferred compounds of the present invention.

The $ED_{50}$ of the above referred to compounds in mice was less than 1 mg./kg. The $ED_{50}$ was determined by the injection of the appropriate number of doses to mice intraperitoneally and subjecting the results to probit analysis according to the method of J. Litchfield and J. Wilcoxin, J. Pharm. and Exptyl. Therap. 96, 99 (1949).

The acute toxicities ($LD_{50}$'s) of the above referred to compounds were determined in mice. The compounds were given orally using a metal stomach tube and intravenously through a lateral tail vein at a constant rate of 0.05 ml./10 sec. The 95% confidence limit in mg./kg. for 1-[3-(p-acetyl-o-methoxyphenoxy)-propyl]-4-(p-fluorobenzoyl)-piperidine is 136.5–192.4 orally and 58.6–75.9 intravenously. The 95% confidence limit in mg./kg. for 1 - [3-(p-fluorobenzoyl)-propyl]-4-(p-fluorobenzoyl - piperidine is 110.3–164.7 orally and 43.9–57.3 intravenously.

It is therefore an object of the present invention to provide novel compounds and compositions possessing valuable pharmacological properties, that is, tranquilizing activity, and a method for their preparation. Another object is to provide a novel method for the treatment of living animal and especially mammalian bodies, for purposes of relieving anxiety therein. Still another object is to provide compositions which possess beneficial tranquilizing activity and have minimum side effects. Additional objects will be apparent to one skilled in the art and still other objects will become apparent hereinafter.

In the definition of the symbols in the foregoing Formula I and where they appear elsewhere throughout this specification the terms have the following significance.

The term "lower alkyl" as used herein includes straight and branched chain radicals of up to eight carbon atoms inclusive, preferably no more than six carbon atoms, and is exemplified by such groups as methyl, ethyl, propyl, isopropyl, butyl, sec. butyl, tertiary butyl, amyl, isoamyl, hexyl, heptyl, octyl, and the like. A "lower-alkoxy" group has the formula —O-lower-alkyl.

Included in the term "aryllower-alkyl" are lower-alkyl substituted phenyl groups such as benzyl, phenethyl, methyl benzyl, phenpropyl and the like.

An "aryl" radical refers to the phenyl radical alone or to a phenyl radical substituted by any radical or radicals which are not reactive or otherwise interfering under the conditions of reaction, such radicals including lower alkoxy, lower alkyl, trifluoromethyl, halo and the like. The aryl radicals have preferably no more than one to three substituents such as those given above and, furthermore, these substituents can be in various available positions of the aryl nucleus and, when more than one substituent is present, can be the same or different and can be in various position combinations relative to each other.

An "aroyl" radical has the formula

An "aryloxy" radical has the formula —O-aryl.

This invention also includes acid addition salts of the above defined bases formed with nontoxic organic and inorganic acids. Such salts are easily prepared by methods known in the art. When the compounds are to be used as intermediates for preparing other compounds or for any other non-pharmaceutical use, the toxicity or non-toxicity of the salt is immaterial; when the compounds are to be used as pharmaceuticals, they are most conveniently used in the form of nontoxic acid-addition salts. Both toxic and nontoxic salts are therefore within the purview of the invention. The acids which can be used to prepare the preferred nontoxic acid-addition salts are those which produce, when combined with the free bases, salts whose anions are relatively innocuous to the animal organism in therapeutic doses of the salts, so that beneficial physiological properties inherent in the free bases are not vitiated by side effects ascribable to the anions.

The base is reacted with the calculated amount of organic or inorganic acid in aqueous miscible solvent, such as ethanol or isopropanol, with isolation of the salt by concentration and cooling, or the base is reacted with an excess of the acid in aqueous immiscible solvent, such as ethyl ether or isopropyl ether, with the desired salt separating directly. Exemplary of such organic salts are those formed with maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic acid and the like. Exemplary of such inorganic salts are those formed with hydrochloric, hydrobromic, sulfuric, sulfamic, phosphoric and nitric acids.

In preparing the novel 1-substituted-3-aroylpiperidines and 1-substituted-4-aroylpiperidines of the present invention, isonipecotic acid and nipecotic acid are useful starting materials. The novel compounds are prepared generally as follows:

(1) Isonipecotic acid is reacted with a lower acyl anhydride under refluxing conditions to give a 1-lower acyl isonipecotic acid of Formula II.

lower acyl—N—CH₂CH₂CH(COOH)CH₂CH₂  Formula II (2) The 1-lower acyl isonipecotic acid is converted to the corresponding 1-lower acyl isonipecotic acid halide of Formula III, wherein X is a halogen atom by reaction of the free acid with a suitable thionyl halide.

lower acyl—N—CH₂CH₂CH(COX)CH₂CH₂  Formula III (3) Reaction of the 1-lower acyl isonipecotoyl halide of Formula III with an aryl compound in the presence of an aluminum halide gives a 1-lower acyl-4-aroylpiperidine of Formula IV, wherein R¹ is as defined above and wherein the aryl moiety corresponds to the aryl compound used in the reaction.

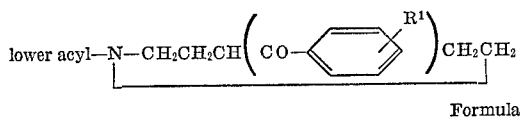

Formula IV (4) Acid hydrolysis of the lower acyl group of a 1-lower acyl-4-aroylpiperidine of Formula IV using dilute mineral acid gives the 4-aroylpiperidines of Formula V.

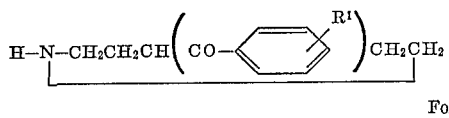

Formula V (5) The reaction of 4-aroylpiperidines of Formula V with compounds having reactive moieties furnishes novel compounds of Formula I, particularly those piperidine compounds wherein the aroyl group is attached to the 4 position of the piperidine ring. In addition, novel compounds within the scope of Formula I as, for example, 1-(omega-hydroxyalkyl)-4-aroylpiperidines, prepared as hereinabove described by reacting a 4-aroylpiperidine with an omega-hydroxyalkyl halide are useful in preparing additional compounds embraced by Formula I.

The sequence of reactions (1) to (5) disclosed immediately hereinabove are applicable to the preparation of 1-substituted-3-aroylpiperidines embraced by Formula I and is more fully exemplified in the examples described hereinafter.

An alternate procedure for the preparation of 1-substituted-4-aroylpiperidines employs the readily available 1-acetyl-4-carbamoylpiperidine according to the following reaction sequence.

(6) 1-acetyl-4-carbamoylpiperidine is dehydrated using phosphorus pentoxide to give 1-acetyl-4-cyanopiperidine of Formula VI.

Formula VI (7) The reaction of 1-acetyl-4-cyanopiperidine of Formula VI with an arylmagnesium halide followed by hydrolysis of the intermediate ketimine furnishes a 1-acetyl-4-aroylpiperidine of Formula VII.

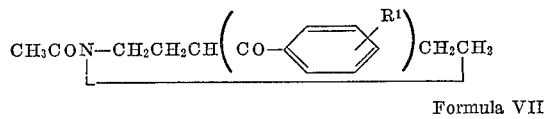

Formula VII (8) Acid hydrolysis of the acetyl group of 1-acetyl-4-aroylpiperidine of Formula VII using dilute mineral acid gives the 4-aroylpiperidines of Formula V from which novel compounds of Formula I can be prepared as described in (5) hereinabove.

Similarly as outlined in reaction sequence (6) to (8) given above, 1-substituted-3-aroylpiperidines of Formula I can be prepared starting from 1-acetyl-3-carbamoylpiperidine.

An alternate reaction procedure for the preparation of 1-substituted-4-aroylpiperidines employs γ-halobutyrophenones as starting materials and is more fully set forth in the following reaction sequence.

(9) A γ-halobutyrophenone, preferably, but not necessarily having the carbonyl group protected by reaction with ethylene glycol is reacted with ethanolamine to give a 2-aryl-2-[3-N-(2-hydroxyethyl)-propyl]-1,3 - dioxolane of Formula VIII.

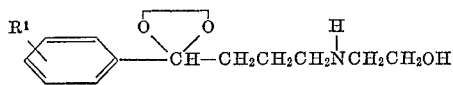

Formula VIII

(10) The 2-aryl-2-[3-N-(2-hydroxyethyl)-propyl]-1,3-dioxolane of Formula VIII can be reacted with a variety of reactants having active halogen atoms to give γ-[N-(2-hydroxyethyl) - N - substituted]-aminobutyrophenones of Formula IX, the free ketone being regenerated during workup of the reaction mixture.

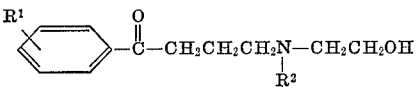

Formula IX

(11) The reaction of a γ-[N-(2-hydroxyethyl)-N-substituted]-aminobutyrophenone of Formula IX with a thionyl halide gives a γ-[N-(2-haloethyl)-N-substituted]-aminobutyrophenone of Formula X.

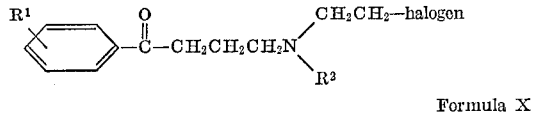

Formula X

(12) The reaction of a γ-[N-(2-haloethyl)-N-substituted]-aminobutyrophenone of Formula X under cyclizing conditions using sodium hydride gives 1-substituted-4-aroylpiperidines of Formula I. Specific examples of reaction sequence (9–12) are given more fully hereinafter in Examples 26–29 inclusive.

The novel compounds of the present invention and the methods for their preparation are exemplified more fully by the following illustrative examples; the scope of the invention is, however, not limited thereto.

EXAMPLE 1

1-acetyl-4-(p-fluorobenzoyl)-piperidine

A mixture of 93 g. (0.7 mole) of aluminum chloride in 150 ml. of fluorobenzene was stirred while 70 g. (0.37 mole) of 1-acetylisonipecotic acid chloride was added in small portions. After the addition was complete, the mixture was refluxed for one hour. The mixture was poured onto ice and the two layers separated. The aqueous layer was extracted twice with chloroform and the chloroform extracts were added to the organic layer. The organic solution was dried over anhydrous sodium sulfate and filtered. The filtrate was concentrated and 73.7 g. (80%) of 1-acetyl-4-(p-fluorobenzoyl)-piperidine was obtained as a crystalline residue. Recrystallization from ligroin-isopropyl ether gave a white crystalline product melting at 75–78° C.

*Analysis.*—Calculated for $C_{14}H_{16}FNO_2$ (percent): C, 67.45; H, 6.47; N, 5.62. Found (percent): C, 67.26; H, 6.50; N, 5.54.

EXAMPLE 2

1-[2-(o-methoxyphenoxy)-ethyl]-4-(p-fluorobenzoyl)-piperidine maleate

A mixture of 11.6 g. (0.056 mole) of 4-(p-fluorobenzoyl)-piperidine, 13.8 g. (0.06 mole) of 2-(o-methoxyphenoxy)-ethyl bromide, and 16.6 g. (0.12 mole) of potassium carbonate in 150 ml. of 1-butanol was refluxed one hour and allowed to stir at room temperature overnight. The mixture was filtered and the filtrate concentrated to yield an oily residue which weighed 18 g. (90%). The maleate salt prepared from the basic residue and maleic acid melted at 154–157° C. after recrystallization from isopropanol.

*Analysis.*—Calculated for $C_{25}H_{28}FNO_7$ (percent): C, 63.41; H, 5.96; N, 2.96. Found (percent): C, 63.62; H, 6.29; N, 3.07.

EXAMPLE 3

4-(p-fluorobenzoyl)-piperidine hydrochloride

A solution of 70.6 g. (0.27 mole) of 1-acetyl-4-(p-fluorobenzoyl)-piperidine in 200 ml. of 6 N hydrochloric acid was refluxed for 2 hours. The cooled solution was extracted twice with ether. The aqueous acidic solution was made basic and extracted with benzene. The benzene extracts were dried over anhydrous sodium sulfate and concentrated. The oily residue weighed 38.2 g. (69%). The hydrochloride salt was made by treating an ether solution of the free base with ethereal hydrogen chloride. Recrystallization of the hydrochloride from isopropanol gave a crystalline solid melting at 222–224° C.

*Analysis.*—Calculated for $C_{12}H_{14}ClFNO$ (percent): C, 59.38; H, 5.81; N, 5.77. Found (percent): C, 59.40; H, 6.20; N, 5.73.

EXAMPLE 4

1-[3-(p-acetyl-o-methoxyphenoxy)-propyl]-4-(p-fluorobenzoyl)-piperidine hydrochloride A mixture of 9.3 g. (0.045 mole) of 4-(p-fluorobenzoyl)-piperidine, 14 g. (0.049 mole) of 3-(p-acetyl-o-methoxyphenoxy)-propyl bromide, and 16.6 g. (0.12 mole) of potassium carbonate in 150 ml. of 1-butanol was allowed to reflux for 1½ hours. The mixture was filtered, the filtrate concentrated, the oily residue dissolved in benzene and the benzene solution extracted with 3 N hydrochloric acid. The aqueous acidic layer was made basic and extracted with ether. The combined ethereal extracts were dried over anhydrous sodium sulfate and concentrated to give an oily residue weighing 5 g. (27%). The hydrochloride salt was prepared by treating an ether solution of the oily residue with ethereal hydrogen chloride. Recrystallization of the salt from isopropanol gave material melting at 210–212° C.

*Analysis.*—Calculated for $C_{24}H_{29}ClFNO_4$ (percent): C, 64.06; H, 6.50; N, 3.11. Found (percent): C, 63.78; H, 6.55; N, 3.14.

EXAMPLE 5

4-(p-fluorobenzoyl)-1-[3-(p-fluorobenzoyl)propyl] piperidine hydrochloride

A mixture of 13.9 g. (0.057 mole) of 4-(p-fluorobenzoyl)piperidine hydrochloride, 15.5 g. (0.063 mole) of 2-(p-fluorophenyl)-2-(ω-chloropropyl)-1,3-dioxolane, and 27.6 g. (0.2 mole) of potassium carbonate in 150 ml. of 1-butanol was refluxed 20 hours. The mixture was filtered, the filtrate concentrated, the oily residue dissolved in 50 ml. of an ether-methanol mixture and this solution stirred with 100 ml. of 3 N hydrochloric acid for one hour. The mixture was cooled, the layers separated, the aqueous layer basified and the basic mixture extracted with ether. The ethereal extracts were dried over anhydrous sodium sulfate, the mixture filtered and the filtrate treated with ethereal hydrogen chloride. The salt, which weighed 17.2 g. (74%), was recrystallized from an isopropanol-methanol mixture. The dried hydrochloride salt melted at 255–257° C.

*Analysis.*—Calculated for $C_{22}H_{24}ClF_2NO_2$ (percent): C, 64.78; H, 5.93; N, 3.44. Found (percent): C, 64.77; H, 6.02; N, 3.34.

EXAMPLE 6

4-(p-fluorobenzoyl)-1-[3-(o-methoxyphenoxy)propyl] piperidine hydrochloride

A mixture of 12.2 g. (0.05 mole) of 4-(p-fluorobenzoyl)piperidine hydrochloride, 13.5 g. (0.055 mole) of 3-(o-methoxyphenoxy)propyl bromide, and 27.6 g. (0.2 mole) potassium carbonate in 150 ml. of 1-butanol was refluxed 26 hours. The mixture was filtered, the filtrate concentrated and the oily residue was dissolved in anhydrous ether. Treatment of the ether solution with ethereal hydrogen chloride gave a crystalline hydrochloride. The salt weighed 18.2 g. (89%). After recrystallization from isopropanol and drying under vacuum, the hydrochloride melted at 170–173° C.

*Analysis.*—Calculated for $C_{22}H_{27}ClFNO_3$ (percent): C, 64.77; H, 6.67; N, 3.43. Found (percent): C, 64.64; H, 6.56; N, 3.22.

EXAMPLE 7

4-(p-fluorobenzoyl)-1-[2-(o-ethoxyphenoxy)ethyl] piperidine hydrochloride

A mixture of 13.2 g. (0.054 mole) of 2-(o-ethoxyphenoxy) ethyl bromide, 10.3 g. (0.043 mole) of 4-(p-fluorobenzoyl)piperidine hydrochloride, and 27.6 g. (0.2 mole) of potassium carbonate in 150 ml. of 1-butanol was refluxed 2½ hours. After standing at room temperature overnight, the mixture was filtered, the filtrate concentrated, the residual oil dissolved in ether, and the ether solution extracted with 3 N hydrochloric acid. The aqueous acetic layer was made basic and extracted with ether. The combined ethereal extracts were dried over anhydrous sodium sulfate and filtered. The hydrochloride was prepared by treating the ether solution with ethereal hydrogen chloride to give 11.1 g. (55%) of the salt. The hydrochloride salt was recrystallized from isopropanol and melted at 198.5–200.5° C.

*Analysis.*—Calculated for $C_{22}H_{27}ClFNO_3$ (percent): C, 64.77; H, 6.67; N, 3.44. Found (percent): C, 64.64; H, 6.76; N, 3.40.

EXAMPLE 8

4-(p-fluorobenzoyl)-1-[3-(p-fluorophenoxy)propyl] piperidine hydrochloride

A mixture of 12.2 g. (0.05 mole) of 4-(p-fluorobenzoyl)piperidine hydrochloride, 12.9 g. (0.055 mole) of 3-(p-fluorophenoxy)propyl bromide, and 27.6 g. (0.2 mole) of potassium carbonate in 150 ml. of 1-butanol was refluxed 20 hours. The mixture was filtered, the filtrate concentrated, the solid residue dissolved in ether and the hydrochloride salt was prepared by adding ethereal hydrogen chloride to the ether solution. Recrystallization from isopropanol gave 11.2 g. (57%) of the salt which melted at 183–187° C. After drying under vacuum, the salt melted at 186–188.5° C.

*Analysis.*—Calculated for $C_{21}H_{24}ClF_2NO_2$ (percent): C, 63.71; H, 6.11; N, 3.54. Found (percent): C, 63.74; H, 6.10; N, 3.69.

EXAMPLE 9

1-acetyl-4-benzoylpiperidine

To a stirred mixture of 42.5 g. (0.32 mole) of aluminum chloride in 100 ml. of dry benzene was added in small portions 30.5 g. (0.16 mole) of 1-acetylisonipecotic acid chloride. After the addition was complete, the mixture was refluxed for one hour and then poured onto ice. The benzene layer was separated and the aqueous layer extracted with benzene. The combined benzene solutions were dried over magnesium sulfate and the benzene evaporated at reduced pressure. The residue which crystallized on cooling was recrystallized from a benzeneisopropyl ether mixture. The product weighed 23 g. (62% yield) and melted at 82–85° C. The material melted at 83–85° C. after it was recrystallized again from the same solvent system.

*Analysis.*—Calculated for $C_{14}H_{17}NO_2$ (percent): C, 72.70; H, 7.41; N, 6.06. Found (percent): C, 72.70; H, 7.52; N, 6.15.

EXAMPLE 10

1-[3-(p-acetylphenoxy)propyl]-4-(p-fluorobenzoyl) piperidine hydrochloride

A mixture of 15.0 g. (0.062 mole) of 4-(p-fluorobenzoyl)piperidine hydrochloride, 17.5 g. (0.068 mole) of 3-(p-acetylphenoxy)propyl bromide, and 34.5 g. (0.25 mole) of potassium carbonate in 150 ml. of 1-butanol was refluxed 12 hours. The mixture was filtered, the filtrate concentrated, and the solid residue which remains was crystallized from isopropyl ether. The solid melted at 104–106° C. The solid amine was dissolved in isopropanol, and the hydrochloride salt was prepared by the addition of ethereal hydrogen chloride. The hydrochloride salt which was recrystallized from isopropanol weighed 15.9 g. (67%) and melted at 191–194° C.

*Analysis.*—Calculated for $C_{23}H_{27}ClFNO_3$ (percent): C, 65.78; H, 6.48; N, 3.34. Found (percent): C, 65.47; H, 6.54; N, 3.59.

EXAMPLE 11

4-(p-fluorobenzoyl)-1-phenethyl-piperidine hydrochloride

A mixture of 12.2 g. (0.05 mole) of 4-(p-fluorobenzoyl)piperidine hydrochloride, 10.2 g. (0.055 mole) of phenethyl bromide, and 27.6 g. (0.2 mole) of potassium carbonate in 150 ml. of 1-butanol was refluxed 2 hours. The mixture was filtered, the filtrate concentrated, and the solid residue which remained weighed 14.8 g. (95%). The hydrochloride salt was prepared by treating an ether solution of the solid with ethereal hydrogen chloride. After recrystallization from isopropanol, the hydrochloride salt melted at 254–257° C.

*Analysis.*—Calculated for $C_{20}H_{23}ClFNO$ (percent): C, 69.05; H, 6.66; N, 4.03. Found (percent): C, 69.02; H, 6.62; N, 4.03.

EXAMPLE 12

4-benzoylpiperidine hydrochloride

A solution of 20 g. of 1-acetyl-4-benzoylpiperidine in 80 ml. of 6 N hydrochloric acid was heated at reflux for four hours, cooled and made basic with 50% sodium hydroxide solution. The oil which separated was extracted with benzene and the combined extracts were washed with cold water. The solvent was evaporated leaving 12.1 g. (74% yield) of residual oil which crystallized (M.P. 49–50° C.). To a solution of 1.6 g. of the free base in warm isopropanol was added ethereal hydrogen chloride. The white crystalline product which formed weighed 1.4 g. and melted with decomposition at 223–225° C. The salt which was recrystallized from isopropanol started to soften at 220° C. and melted with decomposition at 223–225° C.

*Analysis.*—Calculated for $C_{12}H_{16}NOCl$ (percent): C, 63.85; H, 7.15; N, 6.21. Found (percent): C, 64.17; H, 7.16; N, 6.17.

EXAMPLE 13

1-[3-(p-acetyl-o-methoxyphenoxy)-propyl]-4-benzoylpiperidine hydrochloride

A mixture of 4.7 g. (0.025 mole) of 4-benzoylpiperidine, 7.2 g. of 3-(p-acetyl-o-methoxyphenoxy)-propyl bromide, 14 g. of potassium carbonate and 100 ml. of toluene was refluxed 40 hours, cooled and treated with 100 ml. of water. The organic layer was separated, washed with water and the solvent evaporated at reduced pressure. The residual oil which crystallized on standing was recrystallized from a benzene-isooctane mixture. The white product melted at 95–96.5° C. and weighed 6.5 g. (66% yield). A portion (6.2 g.) of the free base was dissolved in warm isopropanol and treated with ethereal hydrogen chloride. The white crystalline product which formed on cooling weighed 6.3 g. and melted at 201–203.5° C.

*Analysis.*—Calculated for $C_{24}H_{30}NO_4Cl$ (percent): C, 66.73; H, 7.00; N, 3.24. Found (percent): C, 66.82; H, 7.16; N, 3.25.

EXAMPLE 14

1-[3-(p-acetylphenoxy)-propyl]-4-benzoylpiperidine hydrochloride

A stirred mixture of 3.8 g. of (0.02 mole) of 4-benzoylpiperidine, 5.1 g. (0.02 mole) of 3-(p-acetylphenoxy) propyl bromide, 12 g. of potassium carbonate and 100 ml. of toluene was refluxed 16 hours, cooled and treated with 100 ml. of water. The organic layer was separated, washed with water and the solvent evaporated at reduced pressure. The residual oil which crystallized on standing (M.P. 72–80° C.) was dissolved in warm isopropanol and treated with ethereal hydrogen chloride. The light yellow salt which formed on cooling melted at 190–193° C. and weighed 4.1 g. (51% yield). After the product was treated with charcoal and recrystallized from isopropanol, it melted at 192–194° C. and weighed 2.6 g.

*Analysis.*—Calculated for $C_{23}H_{28}NO_3Cl$ (percent): C, 68.73; H, 7.02; N, 3.49. Found (percent): C, 68.74; H, 7.04; N, 3.67.

EXAMPLE 15

1-[2-(p-acetyl-o-methoxyphenoxy)ethyl-4-(p-fluorobenzoyl)piperidine

A mixture of 15.0 g. of (0.062 mole) of 4-(p-fluorobenzoyl)piperidine hydrochloride, 18.5 g. (0.068 mole) of 2-(p-acetyl-o-methoxyphenoxy)ethyl bromide, and 34.5 g. (0.25 mole) of anhydrous potassium carbonate in 200 ml. of 1-butanol was refluxed 12 hours. The mixture was filtered, and the residue washed with chloroform. The chloroform-butanol mixture was concentrated under reduced pressure and the solid residue which remained was dissolved in isopropyl ethyl. The 10.9 g. (44%) of yellow crystals that separated melted at 133–136° C. upon drying under vacuum.

*Analysis.*—Calculated for $C_{23}H_{26}FNO_4$ (percent): C, 69.15; H, 6.56; N, 3.51. Found (percent): C, 69.26; H, 6.52; N, 3.32.

EXAMPLE 16

1-carbamoyl-4-(p-fluorobenzoyl)piperidine

A slurry of 5.25 g. (0.05 mole) of nitrourea in 10 ml. of 95% ethanol was added to a solution of 8.0 g. (0.039 mole) of 4-(p-fluorobenzoyl)piperidine in 50 ml. of 95% ethanol, and the mixture was stirred at 50–60° C. for 1½ hours. The mixture was filtered and the filtrate concentrated under reduced pressure. The solid residue which remained was dissolved in chloroform and the mixture was filtered. Six grams (62%) of product crystallized from the cooled filtrate. Upon recrystallization from chloroform 5 g. of 1-carbamoyl-4-(p-fluorobenzoyl)piperidine was obtained which melted at 137–140° C.

*Analysis.*—Calculated for $C_{13}H_{15}FN_2O_2$ (percent): C, 62.39; H, 6.04; N, 11.20. Found (percent): C, 62.36; H, 6.03; N, 11.26.

EXAMPLE 17

4-benzoyl-1-[3-p-fluorobenzoyl)-propyl]-piperidine hydrochloride

A stirred mixture of 7.0 g. (0.037 mole) of 4-benzoyl-piperidine, 9.8 g. (0.040 mole) of 2-phenyl-2-(ω-chloropropyl)-1,3-dioxolane, 20 g. of potassium carbonate and 100 ml. of 1-butanol was refluxed 16 hours, cooled, filtered and the solvent evaporated at reduced pressure. The residual oil was stirred with 100 ml. of 3 N hydrochloric acid and 100 ml. of ethanol for one hour. The mixture was made basic with 50% sodium hydroxide solution and the oil which separated was extracted with benzene. The combined extracts were washed with water, dried over magnesium sulfate and the solvent evaporated. The residue was dissolved in isopropanol and treated with ethereal hydrogen chloride. The white crystalline product which formed was recrystallized from an isopropanol-ethanol mixture. The salt weighed 8.4 g. (59% yield) and melted at 230–233° C.

*Analysis.*—Calculated for $C_{22}H_{25}ClFNO_2$ (percent): C, 67.77; H, 6.46; N, 3.59. Found (percent): C, 67.58; H, 6.41; N, 3.61.

EXAMPLE 18

4-(p-fluorobenzoyl)-1-[2-(N-methyl-carbamoyloxy) ethyl]piperidine

To a solution of 3.0 g. (0.012 mole) of 4-(p-fluorobenzoyl)-1-(2-hydroxyethyl)piperidine in 30 ml. of dry benzene was added 0.69 g. (0.012 mole) of methyl isocyanate. The solution was stirred under nitrogen at room temperature for one hour. The solution was concentrated under vacuum and the solid residue which remained was recrystallized from isopropyl ether. The tan solid which was obtained weighed 1.1 g. (30%) and melted at 93–94.5° C.

*Analysis.*—Calculated for $C_{16}H_{21}FN_2O_3$ (percent): C, 62.32; H, 6.87; N, 9.09. Found (percent): C, 62.38; H, 7.00; N, 9.26.

EXAMPLE 19

1-acetyl-4-(p-methoxybenzoyl)-piperidine

To a stirring mixture of 133.3 g. (1.0 mole) of aluminum chloride in 200 ml. of anisole was added portionwise 100 g. (0.53 mole) of N-acetylisonipecotic acid chloride. The reaction mixture was maintained at room temperature with a water bath during the addition of the acid chloride. After addition was complete, the mixture was allowed to stir until the evolution of gas ceased. The reaction mixture was poured into a breaker of ice, and the resulting mixture was extracted with chloroform. The combined chloroform extracts were dried with anhydrous sodium sulfate. After filtration, the filtrate was concentrated under vacuum. The solid residue which remained weighed 77.0 g. (56%) and melted at 107–111° C. Upon recrystallization from isopropanol the solid melted at 115.5–117.5° C.

*Analysis.*—Calculated for $C_{15}H_{19}NO_3$ (percent): C, 68.94; H, 7.33; N, 5.36. Found (percent): C, 69.06; H, 7.45; N, 5.42.

EXAMPLE 20

1-[4-(p-acetyl-o-methoxyphenoxy)butyl]-4-(p-fluorobenzoyl)piperidine hydrochloride A mixture of 6.1 g. (0.025 mole) of 4-(p-fluorobenzoyl)piperidine hydrochloride, 8.3 g. (0.028 mole) of 4-(p-acetyl-o-methoxyphenoxy)butyl bromide and 15.2 g. (0.11 mole) of potassium carbonate in 150 ml. of dry toluene was refluxed 20 hours. The mixture was filtered and the filtrate was concentrated under vacuum. The solid residue which remained was dissolved in chloroform, and this solution was extracted with 3 N hydrochloric acid. The combined aqueous extracts were made basic and the basic solution was extracted with chloroform. The collected chloroform extracts were dried with anhydrous sodium sulfate. After filtration, the filtrate was concentrated under vacuum. The solid residue was dissolved in isopropanol and an excess of ethereal hydrogen chloride was added. The hydrochloride which was obtained weighed 9.5 g. (89%) and after recrystallization from isopropanol-isopropyl ether melted at 160–163° C.

*Anlaysis.*—Calculated for $C_{25}H_{30}ClFNO$ (percent): C, 64.71; H, 6.74; N, 3.02. Found (percent): C, 64.50; H, 6.90; N, 3.09.

EXAMPLE 21

4-(p-methoxybenzoyl)piperidine hydrochloride

A solution of 71.0 g. (0.27 mole) of 1-acetyl-4-(p-methoxybenzoyl)piperidine in 250 ml. of 6 N hydrochloric acid was refluxed 2 hours. The reaction mixture solidified after standing overnight. The solid was dissolved in isopropanol and the hydrochloride was precipitated with isopropyl ether. The hydrochloride which was recrystallized from isopropanol weighed 50.0 g. (84%) and melted at 254–256° C.

*Analysis.*—Calculated for $C_{13}H_{18}ClNO_2$ (percent): C, 61.05; H, 7.09; N, 5.48. Found (percent): C, 61.06; H, 7.17; N, 5.54.

EXAMPLE 22

1-(2-carbamoyloxyethyl)-4-(p-fluorobenzoyl)piperidine

A mixture of 4.0 g. (0.016 mole) of 4-(p-fluorobenzoyl)-1-(2-hydroxyethyl)piperidine and 6.0 g. (0.9 mole) of sodium cyanate in 25 ml. of trifluoroacetic acid was allowed to stir 18 hours. After the addition of 25 ml. of water, the mixture was made basic and extracted with benzene. The combined benzene extracts were dried with anhydrous sodium sulfate. This mixture was filtered and the filtrate was concentrated under vacuum. The solid residue which remained was a mixture of 4-(p-fluorobenzoyl) - 1 - (2 - hydroxyethyl)piperidine and 1-(2-carbamoyloxyethyl)-4-(p-fluorobenzoyl)piperidine. After repeated recrystallizations from isopropanol 0.54 g. (12%) of 1 - (2 - carbamoyloxyethyl)-4-(p-fluorobenzoyl)piperidine was obtained which melted at 154–156° C.

*Analysis.*—Calculated for $C_{14}H_{19}FN_2O_3$ (percent): C, 61.21; H, 6.51; N, 9.52. Found (percent): C, 61.53; H, 6.66; N, 9.18.

EXAMPLE 23

3-benzoylpiperidine hydrochloride

To 500 ml. of thionyl chloride was added 85.6 g. (0.5 mole) of 1-acetylnipecotic acid. The stirred mixture was heated at ca. 60° C. for two hours and then the solvent was evaporated at reduced pressure. The crude acid chloride was taken up in 200 ml. of dry benzene and the resulting solution added slowly to a mixture of 133 g. (1.0 mole) of aluminum chloride in 400 ml. of dry benzene. After the addition was complete the mixture was refluxed one hour and then poured onto cracked ice. The organic layer was separated and the aqueous layer was extracted with benzene. The combined extracts were dried over magnesium sulfate and the solvent was evaporated at reduced pressure. The residual oil which did not crystallize on cooling was distilled at reduced pressure and the fraction boiling at 160–170° C./.05 mm. collected. The crude product weighed 50 g. A mixture of 50 g. of the crude 1-acetyl-3-benzoylpyrrolidine and 200 ml. of 6 N hydrochloric acid was refluxed 12 hours, cooled and extracted with benzene. The aqueous layer was made basic with 50% sodium hydroxide solution and the oil which separated was extracted with benzene. The combined extracts were washed with water, dried over magnesium sulfate and the solvent evaporated at reduced pressure. The residual oil weighed 15.1 g. (16% yield). A portion (2.5 g.) of the free base was dissolved in 50 ml. of isopropanol and treated with ethereal hydrogen chloride. The white crystalline salt which formed weighed 2.4 g.

and melted at 193–195° C. The melting point was unchanged after it was recrystallized again from isopropanol.

*Analysis.*—Calculated for $C_{12}H_{16}NOCl$ (percent): C, 63.85; H, 7.15; N, 6.21. Found (percent): C, 63.99; H, 7.21; N, 6.47.

EXAMPLE 24

3-benzoyl-1-[3-(p-fluorobenzoyl)-propyl]-piperidine hydrochloride

A stirred mixture of 5.7 g. (0.030 mole) of 3-benzoyl-piperidine, 8.3 g. (0.034 mole) of 2-(p-fluorophenyl)-2-(ω-chloropropyl)-1,3-dioxolane, 14 g. of potassium carbonate and 100 ml. of 1-butanol was refluxed 16 hours, cooled, filtered and the solvent evaporated at reduced pressure. After the residual oil was stirred with 100 ml. of 3 N hydrochloric acid and 100 ml. of ethanol for one hour, the solution was made basic with 50% sodium hydroxide solution and the oil which separated was extracted with benzene. The combined extracts were washed with water, dried over magnesium sulfate and the solvent evaporated at reduced pressure. The residual oil was dissolved in isopropanol and treated with ethereal hydrogen chloride. The white crystalline salt which formed melted with decomposition at 206–208° C. and weighed 5.1 g. (44% yield) after it was recrystallized again from isopropanol.

*Analysis.*—Calculated for $C_{22}H_{25}NO_2ClF$ (percent): C, 67.77; H, 6.46; N, 3.59. Found (percent): C, 67.96; H, 6.40; N, 3.65.

EXAMPLE 25

1[3-(p-acetyl-o-methoxyphenoxy)-propyl]-3-benzoylpiperidine oxalate

A stirred mixture of 5.0 g. (0.026 mole) of 3-benzoyl-piperidine, 7.5 g. (0.026 mole) of 3-(p-acetyl-o-methoxyphenoxy)-propyl bromide, 14 g. of potassium carbonate and 100 ml. of toluene was refluxed 16 hours, cooled and treated with 100 ml. of water. The organic layer was separated, washed with water, dried over magnesium sulfate and the solvent evaporated at reduced pressure. The residual oil was treated with a solution of 3.1 g. (0.025 mole) of oxalic acid dihydrate in warm isopropanol and the salt which separated was recrystallized from the same solvent. The light yellow product weighed 6.1 g. (41% yield) and melted at 102–106° C. The material melted at 105–108° C. after it was recrystallized again from isopropanol.

*Analysis.*—Calc'd for $C_{26}H_{31}NO_8$ (percent): C, 64.31; H, 6.44; N, 2.89. Found (percent): C, 64.17; H, 6.68; N, 2.87.

EXAMPLE 26

2-(p-fluorophenyl)-2-[3-N-(2-hydroxyethyl)-propyl]-1,3-dioxolane

A stirred charge of 129 g. (2.1 mole) of 2-aminoethanol was heated to 100–110° C. and treated dropwise with 85 g. (0.35 mole) of 2-(p-fluorophenyl)-2-(3-chloropropyl)-1,3-dioxolane. The temperature of the mixture was raised to 120° C. and heating and stirring was continued for two hours. The mixture was cooled, made basic with 3 N sodium hydroxide and extracted with benzene. The benzene extracts were dried over magnesium sulfate and evaporated to an oil. The major portion, 76 g. (80%) of the oil distilled at 148–150° C./0.1 mm. The oil crystallized on standing and melted at 70–71° C. after recrystallization from isopropyl ether.

*Analysis.*—Calc'd for $C_{14}H_{20}FNO_3$ (percent): C, 62.43; H, 7.49; N, 5.20. Found (percent): C, 62.60; H, 7.56; N, 5.25.

EXAMPLE 27 p-fluoro-γ[N-2-hydroxyethyl-N-2-(o-methoxyphenoxy)ethyl]aminobutyrophenone

A stirred mixture of 33 g. (0.12 mole) of 2-(p-fluorophenyl) - 2 - (3-chloropropyl)-1,3-dioxolane, 30 g. (0.13 mole) of 2-(o-methoxyphenoxy)ethyl bromide, 33 g. of potassium carbonate and 200 ml. of n-butanol was refluxed over night. The mixture was cooled, filtered and stripped to an oil. The only 2,2-disubstituted-1,3-dioxolane was added to 200 ml. 3 N hydrochloric acid and heated on a steam bath with stirring for 30 minutes. The mixture was cooled, triturated with ether, then converted to the free base with 3 N sodium hydroxide solution. The crude base was taken up in chloroform, dried over magnesium sulfate and evaporated to an oil which solidified on standing. Recrystallization from isopropyl ether gave 35.2 g. (78%) of product which melted at 67–73° C. The analytical sample melted at 70–71° C.

*Analysis.*—Calc'd for $C_{21}H_{26}FNO_4$ (percent): C, 67.18; H, 6.98; N, 3.73. Found (percent): C, 67.18; H, 7.06; N, 3.59.

EXAMPLE 28 p-fluoro-γ-[N-(2-chloroethyl)-N-(2-o-methoxyphenoxyethyl)-amino]butyrophenone hydrochloride A solution of 21 g. (0.56 mole) of p-fluoro-γ-(2-hydroxyethyl) - N - (2 - o - methoxyphenoxyethyl)amino] butyrophenone in 50 ml. of chloroform was made strongly acidic by passing in dry hydrogen chloride gas. The mixture was then treated with 0.1 mole of thionyl chloride and refluxed for four hours. The mixture was cooled, poured into water and the chloroform layer was separated, dried over magneseium sulfate and evaporated to an oil. The dark resinous product was crystallized from methyl isobutyl ketone by filtering off the insoluble material from the hot solution and allowing it to cool. The purified product, 3 g. (12%) melted at 162–164° C.

*Analysis.*—Calc'd for $C_{21}H_{26}Cl_2FNO_3$ (percent): C, 58.61; H, 6.09; N, 3.25. Found (percent): C, 58.69; H, 6.19; N, 3.30.

EXAMPLE 30

1-[3-(p-acetyl-o-methoxyphenoxy)propyl]-4-(m-trifluoromethylbenzoyl)piperidine hydrochloride A mixture of 2.0 g. (0.0068 mole) of 4-(m-trifluoromethylbenzoyl)piperidine hydrochloride, 2.6 g. (0.009 mole) of 3-(p-acetyl-o-methoxyphenoxy)propyl bromide and 5.5 g. (0.04 mole) of anhydrous potassium carbonate in 50 ml. of 1-butanol was refluxed for 18 hours. The mixture was filtered and the filtrate was concentrated under vacuum. The residue was dissolved in benzene and placed on a magnesium silicate column. Using a benzeneacetone gradient elution, a single product was obtained. The oil was dissolved in anhydrous ether and an excess of ethereal hydrogen chloride was added. The resulting hydrochloride salt weighed 0.9 g. (47%) and melted at 190–195° C.

*Analysis.*—Calc'd for $C_{25}H_{29}ClF_3NO_4$ (percent): C, 60.06; H, 5.85; N, 2.80. Found (percent): C, 59.87; H, 5.89; N, 2.83.

EXAMPLE 31

1-(2-ethoxyethyl)-4-(p-fluorobenzoyl)-piperidine oxalate

A stirred mixture of 20.7 g. (0.10 mole) of 4-(p-fluorobenzoyl)-piperidine, 19.9 g. (0.13 mole) of 2-bromoethyl ethyl ether, 20 g. of potassium carbonate and 250 ml. of toluene was refluxed for 16 hours, cooled and treated with 200 ml. of water. The organic layer was separated, washed with water and the solvent distilled at reduced pressure. The residual oil was taken up in ether and treated with 12.6 g. (0.10 mole) of oxalic acid dihydrate. The salt that formed was recrystallized from an isopropanol ether mixture yielding 15.0 g. (41%) of product melting at 174–175° C.

*Analysis.*—Calc'd for $C_{18}H_{24}NO_6F$ (percent): C, 58.53; H, 6.55; N, 3.79. Found (percent): C, 58.51; H, 6.36; N, 4.09.

EXAMPLE 32

4-(p-fluorobenzoyl)-1-(4-phenyl-1-piperazinyl-acetyl)piperidine hydrochloride

A stirred mixture of 6 g. (0.02 mole) of 1-chloroacetyl-4-p-fluorobenzoylpiperidine, 3.45 g. (0.02) of 4-phenylpiperazine and 5.4 g. (0.04 mole) of potassium carbonate in 40 ml. of n-butanol was refluxed for 6 hours. The mixture was cooled, poured into water and extracted several times with benzene. The benzene extracts were evaporated to an oil which was dissolved in ethyl ether and treated with etheral hydrogen chloride. The resulting solid was recrystallized from methanol-isopropyl ether, yield 6.5 g. (70%); M.P. 225° C. with decomposition.

*Analysis.*—Calc'd for $C_{24}H_{29}ClFN_3O_2$ (percent): C, 64.64; H, 6.56; N, 9.42. Found (percent): C, 64.58; H, 6.54; N, 9.51.

EXAMPLE 33

1-(N-methylcarbamoyl)-4-(m-trifluoromethylbenzoyl)piperidine

A solution of 0.45 g. (0.0078 mole) of methylisocyanate in 10 ml. of dry benzene was added to a stirring solution of 2.0 g. (0.0078 mole) of 4-(m-trifluoromethylbenzoyl)piperidine in 30 ml. of dry benzene. The mixture was stirred for one hour and allowed to stand overnight. The mixture was concentrated under vacuum. The solid residue was recrystallized from isopropanol and 2.0 g. (86%) of product, melting at 90.5–92.5° C. was obtained.

*Analysis.*—Calculated for $C_{15}H_{17}F_3N_2O_2$ (percent): C, 57.32; H, 5.45; N, 8.91. Found (percent): C, 57.14; H, 5.45; N, 8.81.

EXAMPLE 34

4-(p-fluorobenzoyl)-1-(N-methyl-carbamoyl)piperidine

A solution of 2.4 g. (0.041 mole) of methylisocyanate in 10 ml. of dry benzene was slowly added to a solution of 8.5 g. (0.041 mole) of 4-(p-fluorobenzoyl piperidine in 50 ml. of dry benzene, and the solution was refluxed for two and one half hours. The solution was concentrated under vacuum and the residue dissolved in methanol. Upon adding isopropyl ether, 5.0 g. (46%) of white solid precipitated. The solid melted at 122–124° C.

*Analysis.*—Calculated for $C_{14}H_{17}FN_2O_2$ (percent): C, 63.62; H, 6.49; N, 10.60. Found (percent): C, 63.44; H, 6.60; N, 10.70.

EXAMPLE 35

4-benzoyl-1-dimethylcarbamoylpiperidine

A stirred mixture of 5.7 g. (0.03 mole) of 4-benzoylpiperidine, 3.2 g. (0.03 mole) of dimethylcarbamoyl chloride, 12 g. of potassium carbonate and 80 ml. of toluene was refluxed for 16 hours, cooled, filtered and the solvent evaporated at reduced pressure. The residual oil which crystallized on standing was recrystallized from a benzene-isooctane mixture. The white product melted at 71–72.5° C. and weighed 4.8 g. (67% yield).

*Analysis.*—Calculated for $C_{15}H_{20}N_2O_2$ (percent): C, 69.20; H, 7.74; N, 10.76. Found (percent): C, 69.59; H, 7.87; N, 10.80.

EXAMPLE 36

1-(N,N-dimethylcarbamoyl)-4-(p-fluorobenzoyl)piperidine

A mixture of 10.0 g. (0.048 mole) of 4-(p-fluorobenzoyl)piperidine, 5.2 g. (0.048 mole) of N,N-dimethylcarbamoyl chloride and 13.8 g. (0.1 mole) of anhydrous potassium carbonate in 100 ml. of toluene was stirred at room temperature for one hour. After standing overnight, the mixture was filtered and the residue was washed with chloroform. The filtrate was concentrated under vacuum. The solid residue was dissolved in ligroin, the solution treated with charcoal, filtered and 4.3 g. (33%) of product obtained. The product melted at 105–107° C.

*Analysis.*—Calculated for $C_{15}H_{19}FN_2O_2$ (percent): C, 64.73; H, 6.88; N, 10.06. Found (percent): C, 64.87; H, 6.90; N, 10.34.

EXAMPLE 37

4-(p-fluorobenzoyl)-1-(N-phenylthiocarbamoyl)piperidine

While stirring a solution of 10.0 g. (0.048 mole) of 4-(p-fluorobenzoyl)piperidine in 50 ml. of dry benzene, 6.5 g. (0.048 mole) of phenylisothiocyanate was slowly added. After stirring for 15 minutes at room temperature, the reaction mixture solidified. The solid was dissolved in benzene and the benzene solution treated with charcoal. This recrystallization from benzene gave 12.3 g. (75%) of the product melting at 148.5–150.5° C.

*Analysis.*—Calculated for $C_{19}H_{19}FN_2OS$ (percent): C, 66.64; H, 5.59; N, 8.18. Found (percent): C, 66.53; H, 5.62; N, 8.35.

EXAMPLE 38

1-[N-(m-chlorophenyl)carbamoyl]4-(p-fluorobenzoyl)piperidine

While stirring a solution of 6.5 g. (0.031 mole) of 4-(p-fluorobenzoyl)piperidine in 50 ml. of dry benzene, 4.8 g. (0.031 mole) of m-chlorophenylisocyanate was slowly added. Within five minutes after the addition was complete, the reaction mixture solidified. The mixture was concentrated and the residual solid was dissolved in isopropanol and the solution treated with charcoal. This recrystallization gave 6.6 g. (59%) of product, melting at 169–172° C.

*Analysis.*—Calculated for $C_{19}H_{18}ClFN_2O_2$ (percent): C, 63.25; H, 5.03; N, 7.76. Found (percent): C, 63.27; H, 5.09; N, 7.97.

EXAMPLE 39

1-carbamoyl-4-(p-methoxybenzoyl)piperidine

A mixture of 5.0 g. (0.02 mole) of 4-(p-methoxybenzoyl)piperidine and 2.6 g. (0.025 mole) of nitrourea in 50 ml. of 95% ethanol was allowed to stir at reflux for 20 hours. The mixture was filtered, and the filtrate was concentrated. The solid residue which remained was dissolved in isopropanol and the product crystallized. Recrystallization from isopropanol gave 3.5 g. (67%) of 1-carbamoyl - 4 - (p-methoxybenzoyl)piperidine which melted at 146.5–148.5° C.

*Analysis.*—Calculated for $C_{14}H_{18}N_2O_3$ (percent): C, 64.11; H, 6.92; N, 10.68. Found (percent): C, 64.34; H, 7.05; N, 10.78.

EXAMPLE 40

Ethyl 4-(p-fluorobenzoyl)-1-piperidinecarboxylate

A stirred mixture of 26 g. (0.107 mole) of 4-(p-fluorobenzoyl)piperidine and 29.4 g. (0.214 mole) of potassium carbonate in 70 ml. of methylene chloride was cooled to 0° C. and treated with 11 g. (0.11 mole) of ethylchloroformate. The mixture was treated with 20–25 g. of ice and allowed to warm up to room temperature. The organic layer was separated, washed with dilute hydrochloric acid, dried over magnesium sulfate and concentrated to an oil. A sample was molecularly distilled for analysis; yield 28.5 g. (95%).

*Analysis.*—Calculated for $C_{15}H_{18}NO_3F$ (percent): C, 64.50; H, 6.50; N, 5.02. Found (percent): C, 64.57; H, 6.92; N, 5.14.

EXAMPLE 41

Ethyl 4-(p-methoxybenzoyl)-1-piperidinecarboxylate

Using the procedure described for Example 40, 6 g. (0.02 mole) of 4-p-methoxybenzoyl piperidine hydrochloride and 2.5 g. (0.023 mole) of ethylchloroformate were reacted to form the desired carbamate. The yield of pure product was 6.9 g. (100%). A sample was molecularly distilled for analysis.

*Analysis.*—Calculated for $C_{16}H_{21}NO_4$ (percent): C, 65.96; H, 7.27; N, 4.81. Found (percent): C, 65.76; H, 7.26; N, 4.98.

EXAMPLE 42

1-(2,3-dihydroxypropyl)-4-(p-methoxybenzoyl) piperidine hydrochloride

A mixture of 10.0 g. (0.046 mole) of 4-(p-methoxybenzoyl)piperidine, 5.4 g. (0.049 mole) of 3-chloro-1,2-propanediol and 13.8 g. (0.10 mole) of anhydrous potassium carbonate in 150 ml. of 1-butanol was refluxed for 16 hours. The mixture was filtered, and the filtrate was concentrated. The solid residue which remained was dissolved in isopropanol and an excess of ethereal hydrogen chloride was added. Recrystallization of the hydrochloride salt from isopropanol gave 12.0 g. (89%) of the salt which melted at 149–153° C.

*Analysis.*—Calculated for $C_{16}H_{24}ClNO_4$ (percent): C, 58.26; H, 7.33; N, 4.25. Found (percent): C, 58.23; H, 7.35; N, 4.14.

The present invention also contemplates novel compositions containing the compounds of the invention as active ingredients. In forming the novel compositions of this invention, the active ingredient is incorporated in a suitable carrier, illustratively, a pharmaceutical carrier. Suitable pharmaceutical carriers which are useful in formulating the compositions of this invention include starch, gelatin, glucose, magnesium carbonate, lactose, malt and the like. Liquid compositions are also within the purview of this invention and suitable liquid pharmaceutical carriers include ethyl alcohol, water, saline, propylene glycol, glycerine, glucose syrup and the like. The physical form of the novel compositions depends in part upon the physical characteristics of the active ingredient. When the active ingredient is a solid, the composition is preferably formulated as a capsule or tablet. When the active ingredient is a liquid, the composition is preferably formulated as a soft gelatin capsule. The preferred composition is a tablet containing the active ingredient in the form of its non-toxic acid-addition salt.

The following are examples of compositions formed in accordance with this invention:

(1) CAPSULES

Capsules of 5 mg., 25 mg., and 50 mg. of active ingredient per capsule are prepared. With the higher amounts of active ingredient, reduction may be made in the amount of lactose.

Typical blend for encapsulation:

| | Per capsule, mg. |
|---|---|
| Active ingredient, as salt | 5.0 |
| Lactose | 296.7 |
| Starch | 129.0 |
| Magnesium stearate | 4.3 |
| Total | 435.0 |

Additional capsule formulations preferably contain a higher dosage of active ingredient and are as follows:

| Ingredients | 100 milligrams per capsule | 250 milligrams per capsule | 500 milligrams per capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total milligrams magnesium | 435.0 | 435.0 | 550.0 |

In each case, uniformly blend the selected active ingredient with lactose, starch, and magnesium stearate and encapsulate the blend.

(2) TABLETS

A typical formulation for a tablet containing 5.0 mg. of active ingredient per tablet follows. The formulation may be used for other strengths of active ingredient by adjustment of weight of dicalcium phosphate.

| | Per tablet, mg. |
|---|---|
| (1) Active ingredient, as salt | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| Total | 170.1 |

Uniformly blend 1, 2, 4 and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows:

(A) 50 mg. TABLET

Ingredients:

| | Per tablet, mg. |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, milo starch and the corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

(B) 100 mg. TABLET

Ingredients:

| | Per tablet, mg. |
|---|---|
| Active ingredient, as salt | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

Various modifications and equivalents will be apparent to one skilled in the art and may be made in the compounds, compositions, methods, and procedures of the present invention without departing from the spirit or scope thereof, and it is therefore to be understood that the invention is to be limited only by the scope of the appended claims.

What is claimed:

1. A compound selected from 1-substituted-3-(-4)aroyl-piperidines having the formula:

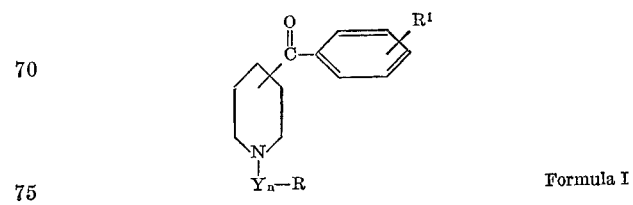

Formula I wherein;

R is selected from the group consisting of monosubstituted phenoxy, disubstituted phenoxy and halobenzoyl wherein the substituent in monosubstituted phenoxy is selected from fluoro, lower-alkoxy and lower alkanoyl and the substituents in disubstituted phenoxy is selected from lower alkanoyl and lower alkoxy, R¹ is selected from the group consisting of hydrogen, lower alkoxy, halogen having an atomic weight less than 80, and trifluoromethyl, Y is methylene, n is a positive integer from 0–4 inclusive, and acid addition salts thereof.

2. A compound of claim 1 which is 1-[2-o-methoxyphenoxy)-ethyl]-4(p-fluorobenzoyl)-piperidine maleate.

3. A compound of claim 1 which is 1-[3-(p-acetyl-o-methoxyphenoxy)-propyl] - 4 - (p-fluorobenzoyl)-piperidine hydrochloride.

4. A compound of claim 1 which is 4-(p-fluorobenzoyl) - 1[3 - (p - fluorobenzoyl)propyl]piperidine hydrochloride.

5. A compound of claim 1 which is 4-(p-fluorobenzoyl) - [3 - (o-methoxyphenoxy)propyl]piperidine hydrochloride.

6. A compound of claim 1 which is 4-(p-fluorobenzoyl) - 1 - [2-(o-ethoxyphenoxy)ethyl]piperidine hydrochloride.

7. A compound of claim 1 which is 4-(p-fluorobenzoyl) - 1 - [3-(p-fluorophenoxy)propyl]piperidine hydrochloride.

8. A compound of claim 1 which is 1-[3-(p-acetylphenoxy)propyl] - 4 - (p - fluorobenzoyl)piperidine hydrochloride.

9. A compound of claim 1 which is 1-[3-(p-acetyl-o-methoxyphenoxy)-propyl] - 4 - benzoylpiperidine hydrochloride.

10. A compound of claim 1 which is 1-[3-(p-acetylphenoxy)-propyl]-4-benzoylpiperidine hydrochloride.

11. A compound of claim 1 which is 1-[2-(p-acetyl-o-methoxyphenoxy)ethyl-4-(p-fluorobenzoyl)piperidine.

12. A compound of claim 1 which is 1-[4-(p-acetyl-o-fluorobenzoyl)-propyl]-piperidine hydrochloride.

13. A compound of claim 1 which is 1-[4-(p-acetyl-o-methoxyphenoxy) - butyl] - 4 - (p-fluorobenzoyl)piperidine hydrochloride.

14. A compound of claim 1 which is 3-benzoyl-1-[3-(p-fluorobenzoyl)-propyl]-piperidine hydrochloride.

15. A compound of claim 1 which is 1-[3-p-acetyl-o-methoxyphenoxy)-propyl]3-benzoylpiperidine oxalate.

16. A compound of claim 1 which is 1-[2(o-methoxyphenoxy)-ethyl] - 4 - (p-fluorobenzoyl)-piperidine maleate.

17. A compound of claim 1 which is 1-[3-(p-acetyl-o-methoxyphenoxy)propyl] - 4 - (m - trifluoromethylbenzoyl)piperidine hydrochloride.

References Cited

UNITED STATES PATENTS 3,125,574   3/1964   Janssen _____ 260—247.5

HENRY R. JILES, Primary Examiner

G. T. TODD, Assistant Examiner

U.S. Cl. X.R.

260—268, 293.4, 294.3, 294.7; 424—267

UNITED STATES PATENT OFFICE
CERTIFICATE OF CORRECTION

Patent No. 3,576,810              Dated April 27, 1971

Inventor(s) Robert L. Duncan, Jr. and Grover C. Helsley

It is certified that error appears in the above-identified patent and that said Letters Patent are hereby corrected as shown below:

Claim 12 should read:

12. A compound of claim 1 which is 4-benzoyl-1-[3-(p-fluorobenzoyl)-propyl]-piperidine hydrochloride.

Signed and Sealed this second Day of March 1976

[SEAL]

Attest:

RUTH C. MASON
Attesting Officer

C. MARSHALL DANN
Commissioner of Patents and Trademarks